Patented July 18, 1933

1,918,467

UNITED STATES PATENT OFFICE

THOMAS AUGUSTUS GOSKAR, OF BURNHAM-ON-SEA, ENGLAND

MANUFACTURE OF DECOLORIZING OR ACTIVATED CARBON

Application filed February 14, 1930, Serial No. 428,403, and in Great Britain February 19, 1929.

This invention relates to improvements in the methods and apparatus employed in the manufacture of decolorizing or activated carbon, which is a carbon of a high degree of purity and capacity for adsorbing and/or absorbing gases and coloring matter. These qualities are impaired by treating carbon at elevated temperatures with various "activating" substances applied usually in gaseous form.

The known processes for the production of activated carbon comprise in the main at least two stages in the first of which carbonaceous materials of either vegetable or mineral origin such as peat, lignite, brown coal or coal are subjected to distillation and carbonization. In the second stage which immediately succeeds the first, the carbonized residue is treated at high temperatures with the activating substance, for example super-heated steam, or other vapors or gases or mixtures thereof.

In order to ensure a high yield of activated carbon of good quality it is essential that the mass of material in the retort should be kept sufficiently open or porous to allow easy and rapid percolation of gases whether evolved in the distilling and carbonizing stage or added for the purpose of activation. It is also desirable that the fragments of material should themselves possess some porosity to allow permeation of the activating gases to the core of each fragment. If these conditions are assured and the operation is carried out with care particularly as regards the temperatures obtaining in the various stages of the operation a very pure product is obtained which contains little or no graphitic or other undesirably carbon modifications.

The preliminary preparation of the raw material is therefore of the utmost importance and has an effect in every stage of the operation.

Primarily according to the present invention I prepare the raw material in such a manner as to ensure approximate uniformity in composition, texture and dimensions. Preferably it is formed into small lumps or pellets of suitable size and density by mixing the raw material such as peat or mixtures of peat and other carbonaceous materials in a moist condition in pugging or macerating machines of any well-known or suitable type designed for breaking up soft fibrous materials, and then extruding the mixture and cutting it to the desired size which may for instance be about one quarter inch to one half inch in diameter and length. Alternatively the moist material may be pressed or molded to the desired size and shape. The texture and density of the pellets may be controlled by varying the moisture content of the mixture, and I have found from 40% to 70% moisture to be very effective during the mixing operation.

After the pellets have been formed by extrusion or molding or othewise they are dried in the upper zones of an apparatus comprising a vertical or inclined chamber or series of chambers through which the material flows by gravity and in which the succeeding operations are carried out. I prefer to reduce the moisture content to 20% or less before the pellets proceed to the carbonizing stage and this may conveniently be done by causing the pellets to flow through a relatively long drying chamber the walls of which for the whole or a part of their length are louvered or reticulated to allow the passage of drying gases across the mass of moist pellets.

This relatively deep bed of moist material constitutes a feature of the present invention in that a sufficient seal is thereby formed at the feeding end of the apparatus to eliminate the need for mechanically operated feed valves, the deep bed of moist material offering a high resistance to the inflow of air from the atmosphere which might otherwise take place under the suction employed to draw the drying gases across the mass of material.

After drying, the pellets pass freely into a carbonizing retort at the lower end of which is the activating chamber. The necessary heat for carbonization is preferably supplied by direct contact of the highly heated gases from the activating zone, which are caused to percolate upwards through the dry pellets, picking up and carrying off with them the gases evolved by distillation. As the temperature progressively increases from the beginning to the end of the carbonizing zone, the gases and vapors are given off at their several volatilization temperatures, and, passing steadily upwards, are in no case subjected to higher temperatures which would tend to crack them. The gases and vapors are then withdrawn from the upper end of the carbonizing zone. This internal heating by percolation of hot gases through the porous bed of pellets which are themselves of porous texture produces a very even heating throughout the bed of material and prevents the formation of graphitic or other undesirable carbon modifications.

The charred pellets from the carbonization stage are next strongly heated to incandescence and subjected to the well-known action of the activating gases which may be steam, air, carbon dioxide, carbon monoxide or hydrogen or suitable non-explosive mixtures of these gases or vapors.

According to my invention I can carry out these processes of drying, preliminary carbonization, and activating in separate apparatus, but in order to ensure regularity of operation and economy I prefer to arrange the separate apparatus in vertical sequence, and thereby form substantially one continuous chamber.

One form of apparatus in accordance with the present invention and specifically adapted for carrying out the process of this invention is illustrated in the accompanying drawings, of which :—

Referring to the drawings :—

Figure 1:
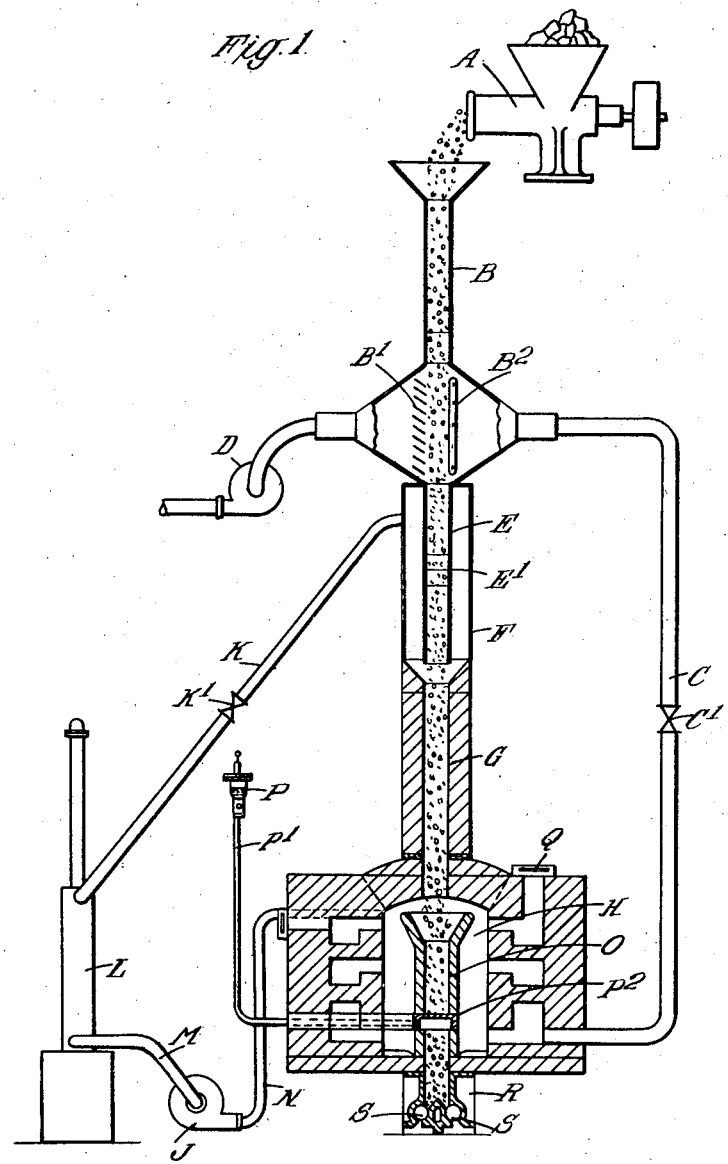
Fig. 1 is a vertical section of the series of chambers in which the pelleted material is treated, the associated apparatus being shown in elevation.

A indicates diagrammatically a pugging or macerating machine of any convenient type into which peat or saw dust or peat and other carbonaceous material or saw dust and other carbonaceous material is fed and from which it is discharged in the form of small pellets of about ¼ inch to ½ inch in diameter and length. The material fed to the machine is in a moist state, containing preferably 40% to 70% moisture, and after thorough pugging is extruded through a die-plate and cut up by a rotating knife (not shown) into pellets of the desired size.

These pellets, still in a moist condition, are discharged directly into the open end of a chamber B of substantial depth and of greater length than breadth in horizontal cross section, wherein they form, due to their moist condition, an effective seal against the passage of atmospheric air through the chamber. In this manner the necessity for mechanically operated feed valves is eliminated.

The lower end of this chamber B is provided with louvered or reticulated walls $B^1$ and $B^2$, the louvers in one case being horizontally, and in the other case vertically, arranged. To this part of the chamber hot products of combustion are supplied by a pipe C controlled by a valve $C^1$ from a combustion chamber to be hereinafter described. The hot gases are sucked by a fan D through the mass of pellets between the walls $B^1$ and $B^2$, substantially reducing their moisture content.

The pellets feed by gravity through a further drying zone E, which is heated by hot gases and vapors rising through a chamber F from a carbonizing retort G which immediately succeeds the chamber E, the pellets passing freely from the open lower end of the latter into the retort. At the commencement of the carbonizing stage the moisture content of the pellets has preferably been reduced to about 20% and the pellets are heated and finally carbonized by direct contact with hot gases drawn by a fan J from a combustion chamber H and caused to pass upwards through the mass in the retort G. The temperature gradually increases from the beginning to the end of the carbonizing stage and due to the upward movement of the gases through the mass of material the various gases and vapors which are distilled off at their several volatilization temperatures are not subjected in their passage upwards to higher temperatures which would tend to crack them.

The hot gases and oil vapors are drawn through the chamber F, and ducts $E^1$ passing across the chamber E, the gases serving in their passage to dry the pellets descending the chamber E, and are led by a pipe K provided with a valve $K^1$ to a condenser L, where the condensible constituents are removed and the stripped gas delivered through pipes M and N to the combustion chamber H, where they are burnt to supply the heat for activation of the carbonized pellets which are delivered from the retort G into an activating chamber O maintained at a temperature of about 900° to 1200° C.

A feature of this invention consists in supplying the activating agent in liquid form so that the quantity may be accurately controlled to produce the desired pressure in the activating chamber.

Superheated steam is a satisfactory activating agent and accordingly water may be delivered from a sight feed regulator P through a pipe $P^1$ to a number of arches or inverted V-shaped channels $P^2$ passing across the chamber C. The water by passage through the combustion chamber H is converted into steam which is superheated by contact with the incandescent mass of pellets and this superheated steam rises evenly through the body of pellets in the chamber O. This even distribution of the activating agent is of great importance and is due largely to the fact that the activating agent is supplied in liquid form, which enables a much more exact regulation of the quantity than if it were supplied as a gas.

The accurate control of the quantity of liquid also enables the pressure in the activating chamber to be similarly controlled, and I have found it advantageous to use a pressure lower than those employed in processes hitherto proposed.

A suitable pressure is measured by a three inch column of water, and this ensures a relatively slow movement of the activating agent through the body of pellets, allowing ample time for it thoroughly to permeate the pellets. In the process of activation in the chamber O, combustible gas is produced which makes its way partly into the combustion chamber H where it is burnt, and is partly drawn up through the retort G, the proportions so dealt with being regulated by the valves C¹ and K¹.

The combustion chamber H is provided with valve-controlled openings Q for the admission of atmospheric air to support combustion of the gases in said chamber.

The activating chamber O is surrounded at its lower end by a water jacket R which serves to cool the material before it is delivered to the atmosphere by means of a pair of rotating valves S, which take the material from both sides of the retort and ensure an even downward passage of the pellets through the activating chamber O. These rotating valves consist preferably of rotatable drums having peripheral pockets, the capacity of which is made variable—for instance, by means of adjustable false bottoms. The water jacket R also surrounds the valve casings and keeps them cool.

Figure 2:
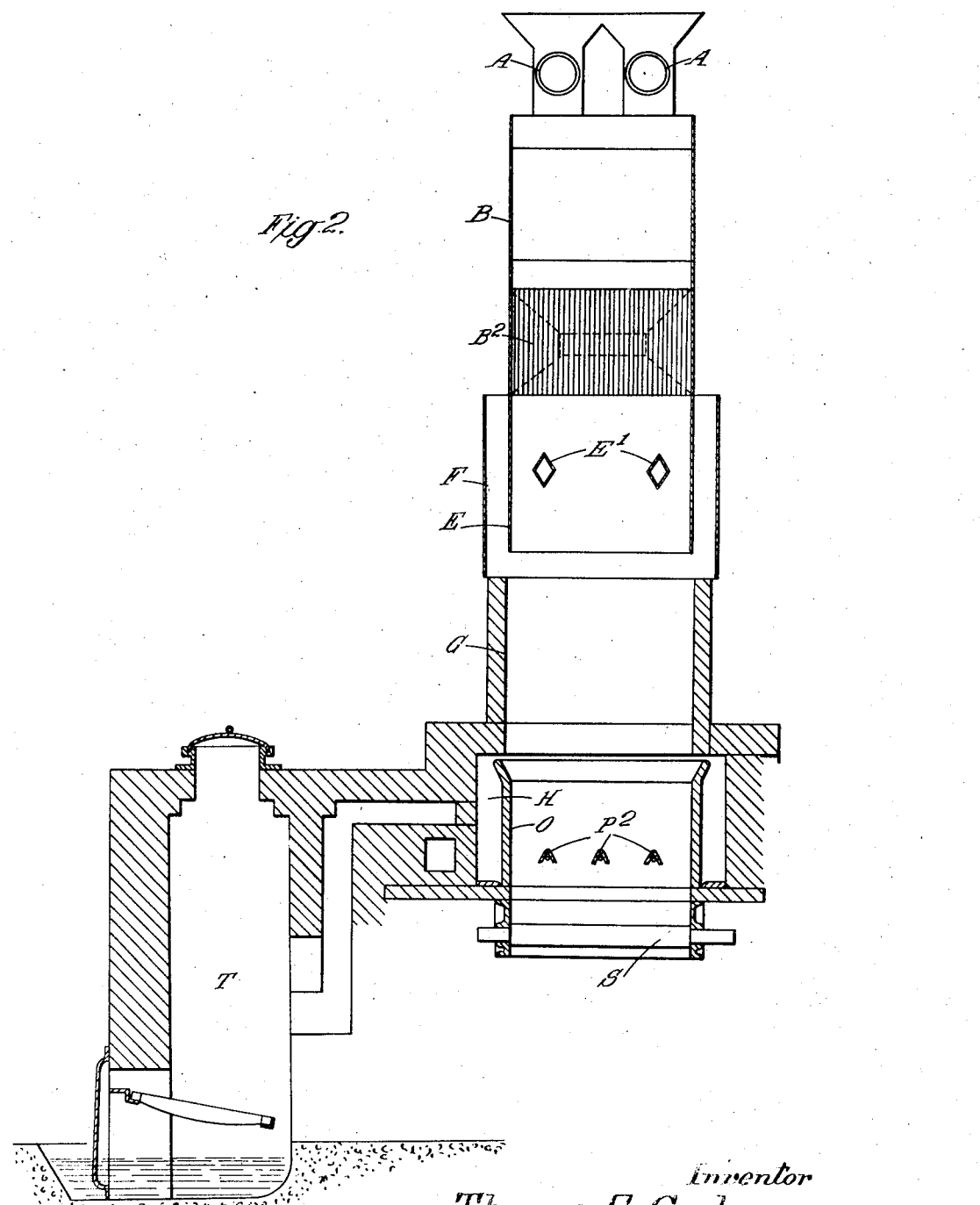
Fig. 2 is a sectional elevation at right angles to Fig. 1.

As illustrated in Fig. 2 a gas producer T may be connected with the combustion chamber H to furnish a supply of gas for starting up the apparatus, after which the process is in most cases self-supporting, a sufficient supply of gas for the heat requirements of the process usually being obtained from the distillation and carbonization of the pelleted raw material.

What I claim is:—

1. A process for the manufacture of "activated" carbon consisting successively in macerating non-distilled carbonaceous material with from 40 to 70 percent by weight of water but with no substantial proportion of binding agents, subjecting said material at a low pressure to a forming operation (e.g. extrusion, moulding) for the production of pellets of substantially uniform size between one-quarter and one-half inch in diameter and of substantially uniform composition and texture, charging said pellets into a substantially upright chamber so as substantially to fill the upper part of said chamber, drying said pellets by passing hot gases therethrough, subjecting said pellets to dry distillation by direct contact with the gases from a subsequent "activating" stage and finally heating the carbonized pellets and treating them with an "activating" agent.

2. A process for the manufacture of "activated" carbon consisting successively in macerating non-distilled carbonaceous material with from 40 to 70 percent by weight of water but with no substantial proportion of binding agents, subjecting said material at a low pressure to a forming operation (e.g. extrusion, moulding) for the production of pellets of substantially uniform size between one-quarter and one-half inch in diameter and of substantially uniform composition and texture, charging said pellets into a substantially upright chamber so as substantially to fill the upper part of said chamber, drying said pellets by passing hot gases therethrough until their moisture content is reduced to not more than 20 percent, subjecting said pellets to dry distillation by direct contact with the gases from the direct "activating" stage and finally heating the carbonized pellets and treating them with an "activating" agent.

3. A continuous process for the manufacture of "activated" carbon consisting successively in macerating non-distilled carbonaceous material with from 40 to 70 percent by weight of water but with no substantial proportion of binding agents, subjecting said material at a low pressure to a forming operation (e.g. extrusion, moulding) for the production of pellets of substantially uniform size between one-quarter and one-half inch in diameter and of substantially uniform composition and texture, charging said pellets into the upper end of a substantially upright drying chamber so as substantially to fill said drying chamber, drying said pellets by passing hot gases through the lower part at least of said chamber, passing said pellets downwardly by gravity into a retort communicating freely with the lower end of said drying chamber for dry distillation by direct contact with the gases from a subsequent "activating" stage and finally passing the carbonized pellets downwardly by gravity into an "activating" chamber communicating freely with the lower end of said retort for heating and treatment with an "activating" agent.

4. A process for the manufacture of "activated" carbon consisting successively in macerating non-distilled carbonaceous material with from 40 to 70 percent by weight of water but with no substantial proportion of binding agents, subjecting said material at a low pressure to a forming operation (e.g. extrusion, moulding) for the production of pellets of substantially uniform size between one-quarter and one-half inch in diameter and of substantially uniform composition and texture, charging said pellets into a substantially upright chamber so as substantially to fill the upper part of said chamber, drying said pellets by passing hot gases therethrough, subjecting said pellets to dry distillation by direct contact with the gases from a subsequent "activating" stage and finally heating the carbonized pellets and treating them with an "activating" agent part at least of which is supplied in liquid form for subsequent evaporation, the supply of said liquid being regulated to produce a pressure between atmospheric and one pound per square inch above atmospheric in the "activating" stage.

THOMAS AUGUSTUS GOSKAR.